Nov. 11, 1941.     D. T. McKINNON     2,262,327

HUMIDOR

Filed Sept. 26, 1939

Inventor
D. T. McKinnon
By Philip A. H. Terrell
Atty

Patented Nov. 11, 1941

2,262,327

UNITED STATES PATENT OFFICE 2,262,327

HUMIDOR

Dougald T. McKinnon, Council Bluffs, Iowa

Application September 26, 1939, Serial No. 296,709

3 Claims. (Cl. 299—24)

The invention relates to humidors, particularly adapted to be supported in the upper end of food receptacles and to supply moisture to food within the receptacle over a long period of time. The device is particularly adapted for use in connection with popcorn receptacles where the proper moisture content of the popcorn is necessary for the satisfactory popping.

A further object is to form the humidor from a porous material having capillary properties and a non-porous cup shaped member embedded in the porous material for holding a predetermined amount of water so it will not rapidly be absorbed by the porous body, but will pass upwardly by capillary attraction and over the cup shaped member into the porous body for maintaining the porous body moistened and the air, within the receptacle, also moistened.

A further object is to provide the upper end of the humidor with an annular flange adapted to rest on the upper end of the receptacle mouth and be held thereon by the receptacle closure.

A further object is to provide connecting arms between the cup shaped member within the porous body and the annular flange, thereby bracing the upper portion of the porous material and at the same time allowing the flange to be disposed on the upper end of the porous body so it will not fracture the porous body when the flange is flexed incident to the tightening of the closure.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
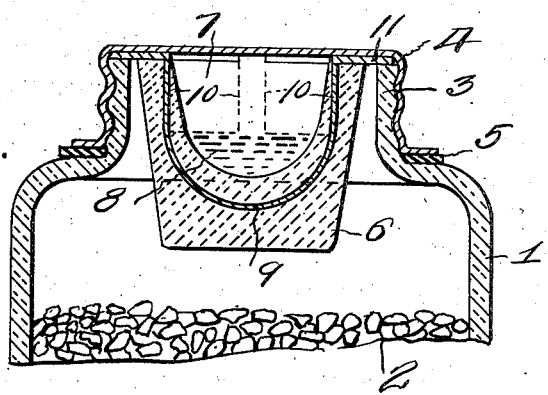
Figure 1 is a vertical transverse sectional view through the device and through the upper end of a receptacle.
Figure 2:
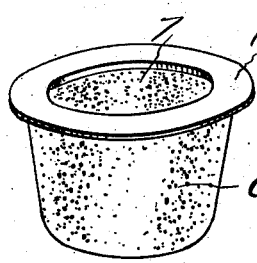
Figure 2 is a perspective view of the humidor.
Figure 3:
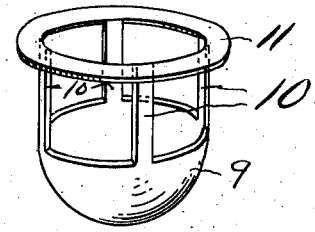
Figure 3 is a perspective view of the moisture retaining cup.

Referring to the drawing, the numeral 1 designates a conventional form of receptacle in which popcorn 2 is placed. It is to be understood that any kind of material may be placed in the receptacle, however, the device is particularly adapted for maintaining the moisture content of popcorn so it will properly pop when desired. The receptacle 1 is provided with a threaded neck 3 for the reception of a threaded closure 4 of conventional construction, and which closure seats against a sealing gasket 5 formed from resilient material.

The humidor comprises a porous body 6 having a chamber 7 therein for the reception of water 8. It has been found that the best popping range for popcorn is from eleven to sixteen per cent moisture, preferably from thirteen to fourteen per cent and that one ounce of water will add three per cent moisture to a quart of popcorn, therefore water is placed in the chamber 7 and held from percolating downwardly by means of a control cup 9 embedded in the porous body 6 below the chamber 7. The cup terminates above the bottom of the chamber 7 and the water passes upwardly by capillary attraction through the upper sides of the porous body and outwardly between the arms 10 carried by the cup and moistens the air so that the moisture is taken up in corn.

The arms 10 are preferably formed integral with the cup 9 and are embedded in the wall of the porous body and terminate in a horizontally disposed annular flange 11 engaging the upper side of of the humidor body. The flange 11 rests on the upper end of the receptacle neck 3 and securely held thereon by the closure, which when tightened forms a water tight seal so the water will not spill from the chamber 7 during the handling of the receptacle. Flange 11 is preferably formed from a ductile material so a close water tight joint is formed when the closure is tightened. It will be seen that by disposing the flange 11 on the upper side of the porous body, said porous body will not be shattered incident to the flexing of the flange when the closure is tightened.

From the above it will be seen that a humidor is provided for receptacles, which is simple in construction and one which may be applied to the receptacle without modifying the construction of the receptacle.

The invention having been set forth what is claimed as new and useful is:

1. A receptacle humidor formed from a porous body and having a chamber therein, a non-porous cup shaped member embedded in the porous body beneath the chamber thereof and having means thereon for supporting said humidor within a receptacle mouth.

2. A device as set forth in claim 1 wherein the supporting means comprises an annular flange carried by the upper end of the cup shaped member and above the porous body, said flange being larger than the porous body and adapted to engage a receptacle neck between a closure and receptacle neck.

3. A device as set forth in claim 1 wherein the supporting means comprises an annular flange above and engaging the upper end of the porous body and spaced arms connecting the cup and the annular flange and embedded in the porous body.

DOUGALD T. McKINNON.